United States Patent
Wareus et al.

(10) Patent No.: US 12,386,975 B2
(45) Date of Patent: Aug. 12, 2025

(54) METHOD FOR FINDING VULNERABILITIES IN A SOFTWARE PROJECT

(71) Applicant: DEBRICKED AB, Malmo (SE)

(72) Inventors: Carl Emil Orm Wareus, Nygatan (SE); Oscar Carl Henrik Reimer, Vargatan (SE)

(73) Assignee: DEBRICKED AB (SE)

( * ) Notice: Subject to any disclaimer, the term of this patent is extended or adjusted under 35 U.S.C. 154(b) by 339 days.

(21) Appl. No.: 17/928,484

(22) PCT Filed: Jun. 2, 2021

(86) PCT No.: PCT/EP2021/064858
§ 371 (c)(1),
(2) Date: Nov. 29, 2022

(87) PCT Pub. No.: WO2021/245171
PCT Pub. Date: Dec. 9, 2021

(65) Prior Publication Data
US 2023/0205892 A1     Jun. 29, 2023

(30) Foreign Application Priority Data
Jun. 2, 2020    (SE) .................................. 2050636-6

(51) Int. Cl.
    *G06F 21/57*          (2013.01)
(52) U.S. Cl.
    CPC ...... *G06F 21/577* (2013.01); *G06F 2221/033* (2013.01)
(58) Field of Classification Search
None
See application file for complete search history.

(56) References Cited

U.S. PATENT DOCUMENTS

| | | |
|---|---|---|
| 10,346,615 B2 | 7/2019 | Sukhomlinov |
| 2016/0188882 A1* | 6/2016 | Mahrous ................ G06Q 50/00 726/25 |

(Continued)

FOREIGN PATENT DOCUMENTS

| | | |
|---|---|---|
| KR | 101893090 B1 | 8/2018 |

OTHER PUBLICATIONS

International Search Report/Written Opinion; PCT/EP2021/064858; Mailed Sep. 6, 2021; 12 pages.

*Primary Examiner* — Fatoumata Traore
(74) *Attorney, Agent, or Firm* — Sheridan Ross P.C.

(57) ABSTRACT

A method (500) for finding vulnerabilities in a software project. The method (500) comprising receiving (S502) a dependency file (202), specifying software components related to the software project; extracting (S506) information from the dependency file (202) using a dependency file parser (204), wherein the dependency file parser (204) is configured for a programming language of the dependency file (202), and wherein the extracted information comprises one or more dependency attributes; generating (S508) a first dependency common platform enumeration, CPE, (206) based on the one or more dependency attributes; receiving (S510) vulnerability CPEs (210) from a vulnerability database, VD, (212) wherein the vulnerability CPEs (210) comprises one or more vulnerability attributes; generating (S512) a first condensed dataset (214) of vulnerability CPEs by selecting the vulnerability CPEs (210) that has at least one vulnerability attribute that matches at least one dependency attribute in the first dependency CPE (206); evaluating (S514) the vulnerability CPEs from the first condensed dataset (214) of vulnerability CPEs by determining a confidence score for each vulnerability CPE, wherein the confidence score is an estimate of a probability of the vulnerability CPE being relevant to the software project;

(Continued)

generating (S516) a second condensed dataset (218) of vulnerability CPEs, wherein the second condensed dataset (218) is smaller than the first condensed dataset (214), from the first condensed dataset of vulnerability CPEs by selecting the vulnerability CPEs that has a confidence score above a threshold.

20 Claims, 6 Drawing Sheets

(56) References Cited

U.S. PATENT DOCUMENTS

| | | |
|---|---|---|
| 2019/0052665 A1 | 2/2019 | Mahieu |
| 2019/0102564 A1* | 4/2019 | Li .............................. G06N 3/04 |
| 2020/0242254 A1* | 7/2020 | Velur .................... G06F 21/552 |

* cited by examiner

METHOD FOR FINDING VULNERABILITIES IN A SOFTWARE PROJECT

TECHNICAL FIELD

The disclosure relates to software development and IT security in general. More particular, it is related to a method for finding vulnerabilities in a software project.

BACKGROUND

In almost all software development today, using open source and third-party components is crucial for its success. It is beneficial to the quality, security, functionality, and development efficiency. However, at the same time, it increases the exposure to vulnerabilities in code developed by third-parties. To maintain control over the security of the developed software, the maintainers need to continuously monitor if vulnerabilities have been introduced or found in these third-party dependencies.

Today, this is commonly done with Dependency Vulnerability Management (DVM) tools which is a process configured for handling vulnerabilities within third-party components. In addition, the DVM tools are configured for automate the process of Software Composition Analysis (SCA) and matching used software components with known vulnerabilities, wherein the SCA is part of the DVM. Today, a common way of doing SCA is by using Structured Query Language (SQL) queries when mapping vulnerabilities to software components.

However, today's solution, wherein the SCA is performed by SQL queries, is that it requires a lot of manual work in order to correctly find vulnerabilities. Thus, it can be both a hard and a time-consuming process to monitor all possible exposures to vulnerabilities. One reason for this is that the included software often can come with its own dependencies and to find most vulnerabilities while maintaining a low number of false-positives, a lot of very specific SQL queries needs to be implemented to handle the high amount of edge-cases. Another problem with these tools is that there is a risk that vulnerabilities are not detected and hence that the software being developed may result in that organizations using the software are exposed to risks they are not aware of. Another problem is that, if the risks are to be reduced, this will require a substantial amount of man hours as well as a well-formed organization that can ensure that quality guidelines are followed. For this reason, there is a demand for a new type of tool that can reduce the risks associated with open source and third-party components in a time-efficient and reliable manner. Further, there is also a demand for a tool with high accuracy and recall, i.e. giving good results and coverage.

SUMMARY

It is an object of the invention to at least partly overcome one or more of the above-identified limitations of the prior art. In particular, it is an object to provide methods and system for finding vulnerabilities in software projects.

According to a first aspect, a method for finding vulnerabilities in a software project is provided. The method comprising:
receiving a dependency file, specifying software components related to the software project;
extracting information from the dependency file using a dependency file parser, wherein the dependency file parser is configured for a programming language of the dependency file, and wherein the extracted information comprises one or more dependency attributes;
generating a first dependency common platform enumeration, CPE, based on the one or more dependency attributes;
receiving vulnerability CPEs from a vulnerability database, VD, wherein the vulnerability CPEs comprises one or more vulnerability attributes;
generating a first condensed dataset of vulnerability CPEs by selecting the vulnerability CPEs that has at least one vulnerability attribute that matches at least one dependency attribute in the first dependency CPE;
evaluating the vulnerability CPEs from the first condensed dataset of vulnerability CPEs by determining a confidence score for each vulnerability CPE, wherein the confidence score is an estimate of a probability of the vulnerability CPE being relevant to the software project; and
generating a second condensed dataset of vulnerability CPEs, wherein the second condensed dataset is smaller than the first condensed dataset, from the first condensed dataset of vulnerability CPEs by selecting the vulnerability CPEs that has a confidence score above a threshold.

The software project should be interpreted as a collection of computer instructions, such as a computer program, that includes any number of software components. Each software component may comprise instructions which, when the software component is executed by a computer, cause the computer to carry out a function of the software project.

The software components, which may also be referred to as dependencies, should be interpreted as already made software included in a software project. As an example, the software components may be third-party software or open source software.

The dependency file should be interpreted as a descriptor of included software components. It may specify what software components are related to a software project.

The dependency file parser should be interpreted as a tool for extracting information from a dependency file in a specific programming language, and returning the information in a common format, shared by all dependency file parsers. There may be one or more dependency files related to each specific programming language.

The programming language of a dependency file should be interpreted as the dependency file having a specific format based on the programming language of the software it describes, and the dependency file type. There may be multiple dependency file types for one programming language of the software.

The CPE should be interpreted as an identifier and metadata of a software. The dependency CPE and vulnerability CPE should be interpreted as an identifier on the same format as the CPE but built by means of this invention instead of e.g. NIST security professionals, which is further described in the detailed description.

The vulnerability database should be interpreted as a database comprising vulnerabilities, wherein each vulnerability has been assigned a common vulnerability enumeration, CVE. As a non-limiting example, the vulnerability database can be a National Vulnerability Database, NVD. However, the database may be any database comprising vulnerabilities, wherein the vulnerabilities may be assigned with CVEs. Any number of vulnerability CPEs may be linked to each CVE of the vulnerability database.

The method may further comprise generating more than one dependency CPE based on the dependency attributes of the dependency file. For example, one dependency CPE may be generated for each dependency, i.e. software component, in the dependency file. Alternatively, the generated dependency CPE may describe more than one dependency. In one example, the dependency CPE may describe all software components of the dependency file.

An advantage by having the disclosed two step method, wherein generating the first condensed dataset may be the first step and generating the second condensed dataset may be the second step, is that it provides for a more efficient way of determining recall and precision in the software project. Thus, it may be possible to improve the recall and precision without damaging earlier generated datasets.

A further advantage with the disclosed method is that it may be possible to dynamically optimize the system and hence, continuously improving the performance of the system.

A yet further advantage is that the risks associated with open source and third-party components may be reduced in a time-efficient and reliable manner.

The one or more dependency attributes may be chosen from the group consisting of dependency vendor, dependency product, dependency version, dependency update or dependency target software.

Dependency vendor may be the owner or distributor of a software product described in the dependency file.

Dependency product may be the name of a software product described in the dependency file.

Dependency version may be the version of a software product described in the dependency file.

Dependency update may be a patch applied to the aforementioned version of a software product described in the dependency file.

Dependency target software may be one or more common target software that are specific to the dependency file parser.

The one or more vulnerability attributes may be chosen from the group consisting of vulnerability vendor, vulnerability product, vulnerability version, vulnerability update or vulnerability target software.

Vulnerability vendor may be the owner or distributor of a vulnerable software product.

Vulnerability product may be the name of a vulnerable software product.

Vulnerability version may be the version of a vulnerable software product.

Vulnerability update may be a patch applied to the aforementioned version of a software product described in the dependency file.

Vulnerability target software may be a language, framework, package manager or large software. A large software may be a large software library such as jQuery.

In addition to the attributes mentioned above, further attributes may be added and used in combination with the attributes mentioned above or separately from the attributes mentioned above.

The method may comprise receiving the dependency file parser from a plurality of dependency file parsers.

Each dependency file parser from the plurality of dependency file parsers may be configured for a specific programming language.

An advantage of having a plurality of dependency file parsers is that the method may be used for a variety of different dependency files and formats.

The step of evaluating the vulnerability CPEs from the first condensed dataset of vulnerability CPEs may comprise the steps, receiving additional feature data from an additional feature database, wherein the additional feature data comprises information about the vulnerability CPEs;

generating, for each vulnerability CPE of the first condensed dataset of vulnerability CPEs in combination with the dependency CPE and the additional feature data, a number of features; and determining the confidence score for each vulnerability CPE by using the features as input to a machine learning, ML, model, wherein the ML model is configured to determine the confidence score by combining the features.

The additional feature data should be interpreted as data that are not available in the vulnerability CPE or the dependency CPE. The additional feature data may be provided from external data sources. The external data sources may comprise data that can be linked to the dependency CPE and/or the vulnerability CPEs and thus, provide additional signal to the system. The term signal is herein meant some sort of correlation between the data and the dependency CPE and/or the vulnerability CPEs.

An advantage of providing additional feature data may be that the additional feature data may provide for a more accurate confidence score by providing more information on whether a vulnerability CPE is a true positive or false positive. The term accurate should be interpreted as the number of correct predications in the end.

The method may further comprise training the ML model, wherein training the ML model comprises:

forming a training dataset, wherein the training dataset comprises historically known pairs of dependency CPEs and vulnerability CPEs labeled with either being a correct match or not;

dividing the training dataset into a training set and a validation set;

fitting parameters of the ML model by applying the model to the training set; and optimizing the ML model using historically known pairs in the validation set.

The training dataset may be constructed manually or by using one or more external data sources. Further, the dataset may be extended by adding new pairs of dependency CPEs and vulnerability CPEs, provided by a user input. As a non-limiting example, a user may label a match as a false positive. The matched pair may then be added to the dataset as an example of an incorrect match.

The ML model may be re-trained to optimize performance, in a pre-defined interval, or when a certain amount of new examples has been added to the training dataset.

The threshold may be a user-defined value.

The matching of at least one attribute between the vulnerability CPE and the dependency CPE may be a partial fit.

A partial fit should be interpreted as two attributes only having a part of the text in common. As a result of using partial fit the recall may be increased. This may be advantageous in that there are a smaller risk of missing relevant vulnerability CPEs.

The step of generating a first condensed dataset of vulnerability CPEs may further comprise the steps.

receiving a number of dependency CPEs from an additional dependency CPE database, wherein the number of dependency CPEs have similar dependency attributes to the first dependency CPE;

selecting additional vulnerability CPEs that has at least one vulnerability attribute that matches at least one dependency attribute in any of the dependency CPEs with similar dependency attributes to the first dependency CPE; and adding the additional vulnerability CPEs to the first condensed dataset of vulnerability CPEs.

An advantage of generating additional dependency CPEs based on the first dependency CPE is that a higher recall may be achieved, i.e. the risk of missing relevant vulnerability CPEs is reduced.

The term "wherein the number of dependency CPEs have similar dependency attributes to the first dependency CPE" should be understood as the number of dependency CPEs have equal dependency attributes or partly equal dependency attributes as the first dependency CPE.

The additional feature data about the vulnerability CPEs may be provided by one or more different or independent data sources.

The one or more independent data sources may be online repositories and/or package managers and/or online forums.

According to a second aspect, a server configured for finding vulnerabilities in a software project is provided. The server comprising a transceiver, a control unit and a memory, wherein the transceiver is configured to:
  receive a dependency file, specifying software components related to the software project;
  receive vulnerability CPEs, wherein the vulnerability CPEs comprise one or more vulnerability attributes, from a vulnerability database, VD;
wherein the control unit is configured to execute:
  an extracting function configured to extract information from the dependency file using a dependency file parser, wherein the dependency file parser is configured for a programming language of the dependency file, and wherein the extracted information comprises one or more dependency attributes;
  a first generating function configured to generate a dependency common platform enumeration, CPE, based on the one or more dependency attributes;
  a second generating function configured to generate a first condensed dataset of vulnerability CPEs by selecting the vulnerability CPEs that has at least one vulnerability attribute that matches at least one dependency attribute in the dependency CPE;
  an evaluating function configured to evaluate the vulnerability CPEs of the first condensed dataset of vulnerability CPEs by determining a confidence score, wherein the confidence score defines a probability of the vulnerability CPE being relevant to the software project; and
  a third generating function configured to generate a second condensed dataset of vulnerability CPEs, wherein the second condensed dataset is smaller than the first condensed dataset, from the first condensed dataset of vulnerability CPEs by selecting the vulnerability CPEs that has a confidence score above a threshold.

The threshold may be a user-defined value.

The matching of at least one attribute between a vulnerability CPE and the dependency CPE may be a partial fit.

The transceiver may be further configured to receive the dependency file parser from a plurality of dependency file parsers.

The one or more dependency attributes may be chosen from the group consisting of dependency vendor, dependency product, dependency version, dependency update or dependency target software.

The one or more vulnerability attributes may be chosen from the group consisting of vulnerability vendor, vulnerability product, vulnerability version, vulnerability update or vulnerability target software.

The transceiver may be further configured to receive additional feature data from an additional feature database, wherein the additional feature data comprises information about the vulnerability CPEs.

The control unit may be further configured to execute a fourth generating function configured to generate, for each vulnerability CPE of the first condensed dataset of vulnerability CPEs in combination with the dependency CPE and the additional feature data, a number of features.

The control unit may be further configured to execute a determining function configured to determine the confidence score for each vulnerability CPE by using the features as input to a machine learning, ML, model, wherein the ML model is configured to determine the confidence score by combining the features.

The control unit may be further configured to execute a training function configured to train the ML model, wherein training the ML model may comprise forming a training dataset, wherein the training dataset comprises historically known pairs of dependency CPEs and vulnerability CPEs labeled with either being a correct match or not, dividing the training dataset into a training set and a validation set, fitting parameters of the ML model by applying the model to training set, and optimizing the ML model using historically known pairs in the validation set.

The transceiver may be further configured to receive a number of dependency CPEs from an additional dependency CPE database, wherein the number of dependency CPEs have similar dependency attributes to the first dependency CPE.

The control unit may be further configured to execute a selecting function configured to select additional vulnerability CPEs that has at least one vulnerability attribute that matches at least one dependency attribute in any of the dependency CPEs with similar dependency attributes to the first dependency CPE.

The control unit may be further configured to execute an adding function configured to add the additional vulnerability CPEs to the first condensed dataset of vulnerability CPEs.

In addition to the attributes mentioned above, further attributes may be added and used in combination with the attributes mentioned above or separately from the attributes mentioned above.

According to a third aspect, a system for finding vulnerabilities in a software project is provided. The system comprising:
  a dependency file parser configured to generate a first dependency common platform enumeration, CPE, based on a dependency file specifying components related to the software project, wherein the first dependency CPE comprises one or more dependency attributes;
  a vulnerability database comprising vulnerability CPEs, wherein the vulnerability CPEs comprise one or more vulnerability attributes;
  a first condensed dataset generator configured to generate a first condensed dataset of vulnerability CPEs by selecting the vulnerability CPEs that has at least one vulnerability attribute that matches at least one dependency attribute in the first dependency CPE;
  a second condensed dataset generator configured to generate a second condensed dataset of vulnerability CPEs, wherein the second condensed dataset is smaller than the first condensed dataset, from the first condensed list of vulnerability CPEs by selecting the vulnerability CPEs that has a confidence score above a threshold; and an additional features database configured to add additional feature data to the system.

In line with the first aspect, an additional dependency CPE database may be added to the second and third aspect.

The system may comprise the server according to the second aspect. The server may be configured to implement the function of the dependency file parser, the first condensed dataset generator and/or the second condensed dataset generator.

Still other objectives, features, aspects and advantages of the invention will appear from the following detailed description as well as from the drawings. The same features and advantages described with respect to one aspect are applicable to the other aspects unless explicitly stated otherwise.

BRIEF DESCRIPTION OF THE DRAWINGS

Embodiments of the invention will now be described, by way of example, with reference to the accompanying schematic drawings, in which.

DETAILED DESCRIPTION

By way of an introduction, a new vulnerability is often reported as a common vulnerability and exposure, CVE. A list of CVEs is maintained by Mitre and each entry may comprise a unique CVE number, a short summary, and at least one external reference. The CVE summary typically includes the affected product and versions. An example of the ShellShock CVE-2014-6271 is given below.

GNU Bash through 4.3 processes trailing strings after function definitions in the values of environmental variables, which allows remote attackers to execute arbitrary code via a crafted environment, as demonstrated by vectors involving the ForceCommand features in OpenSSH sshd, the mod_cgi and mod_cgid modules in the Apache HTTP Server, scripts executed by unspecified DHCP clients, and other situations in which setting the environment occurs across a privilege boundary from Bash execution, aka "ShellShock".

This information is then used by National Vulnerability Database, NVD, adding, among other things, a Common Vulnerability Scoring System, CVSS, score, and a list of common platform enumerations, CPEs. The CVSS score provided by National Institute of Standards and Technology, NIST, is environment independent, but useful when assessing the severity of the vulnerability. The CPE may provide a standardized string for defining which product and versions are affected by the vulnerability.

The current version of CPE is 2.3. The format is given by the string cpe:2.3:part:vendor-product:version:update:edition:language:sw_edition:target_sw:target_hw:other The first part defines that it is a CPE and its version. Then, part can be one of h for hardware, a for application and o for operating system. The following fields are used to uniquely specify the component by as non-limiting examples defining vendor, the name of the product, the product version. It is common to use the fields up to and including version, even though, as can be seen, further details about the component can be defined. A non-limiting example, as can be found in CVE-2014-6271, is given by cpe:2.3:a:gnu:bash:4.3:*:*:*:*:*:*:*

NVD may also provide a JSON feed with CVE data for each vulnerability. This feed supports additional fields for defining ranges of versions that are vulnerable. This feed provides a more efficient representation if there are many versions affected.

Figure 1:
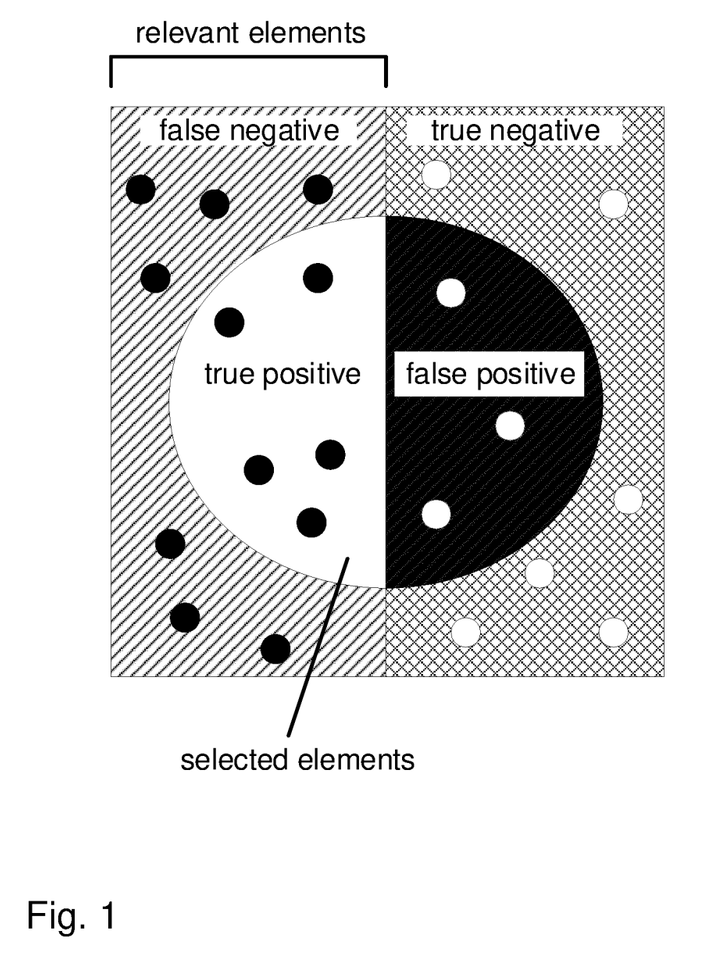
FIG. 1 illustrates the concept of true positives, true negatives, false positives and false negatives.

FIG. 1 illustrates the concept of true positives, true negatives, false positives and false negatives. The concept is described, as a non-limiting example, in relation to a machine learning model having the task of classifying elements as either positive or negative.

True positives are those elements that the machine learning model in a correct way classify as positive.

True negatives are those elements that the machine learning model in a correct way ignores and classify as negative.

False positives are those elements that the machine learning model in an incorrect way classify as positive. They are actually negative.

False negatives are those elements that the machine learning model in an incorrect way ignores, classify as negative. They are actually positive elements.

Put differently, true positives and false positives constitutes the elements that the machine learning model has selected. True positives are those elements that were correctly selected, while false positives are those elements that were incorrectly selected. Similarly, true negatives and false negatives constitutes the elements that the machine learning model chose to ignore. True negatives are those elements that were correctly ignored, while false negatives are those elements that were incorrectly ignored.

The concept of true positives, true negatives, false positives and false negatives can be used to determine precision and recall, which are two evaluation metrics that can be used, for example in information retrieval or classification tasks within machine learning. Precision can be seen as a measure of how many of the selected elements are correctly classified. Recall can be seen as a measure of how many of the positive elements are selected. Precision and recall can be computed as, $$\text{precision} = \frac{\sum \text{true\_positive}}{\sum \text{true\_positive} + \sum \text{false\_positive}}, \quad (1)$$

$$\text{recall} = \frac{\sum \text{true\_positive}}{\sum \text{true\_positive} + \sum \text{false\_negative}}. \quad (2)$$

Figure 2:
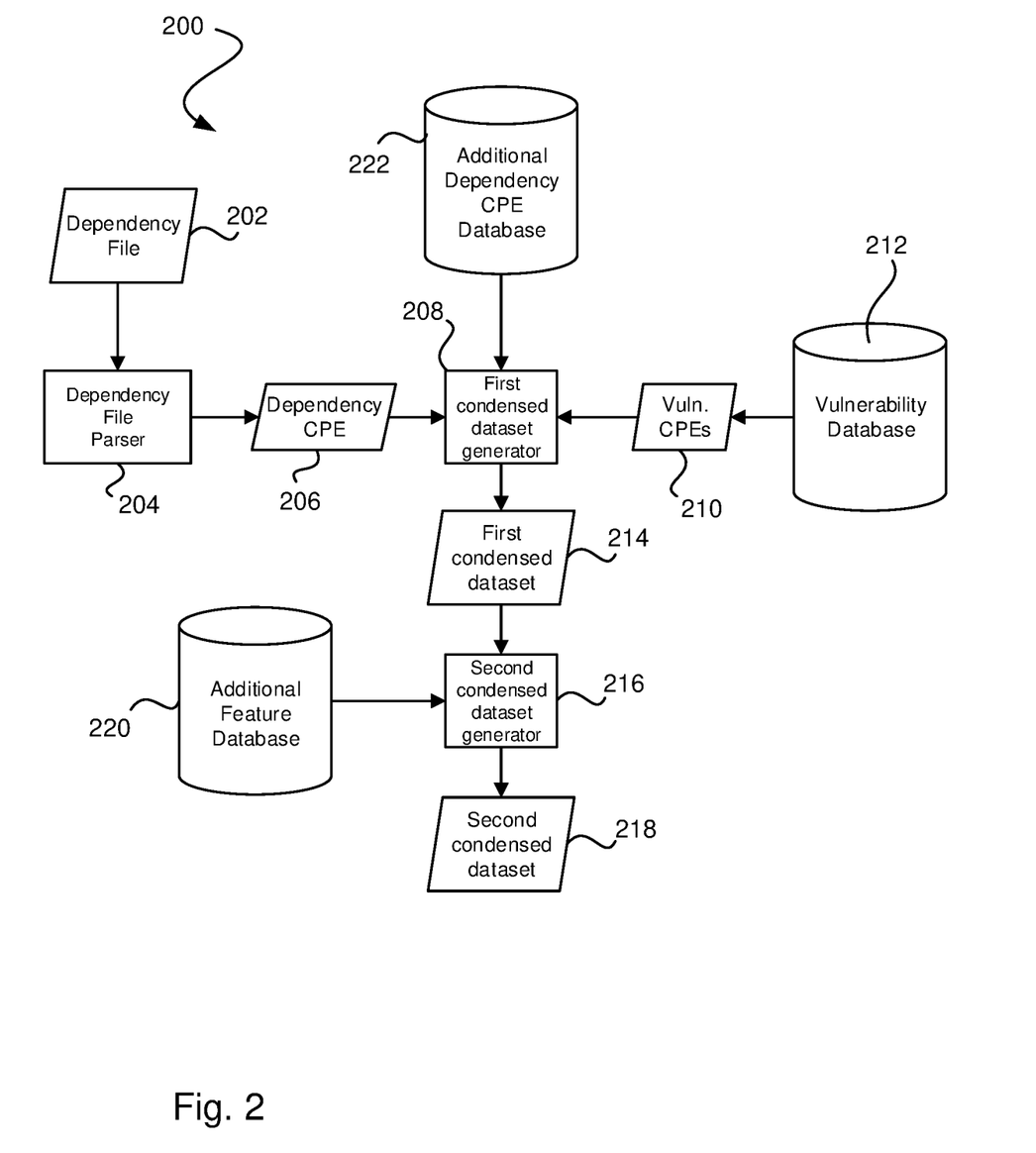
FIG. 2 is a schematic view illustrating a system for finding vulnerabilities in a software project.

FIG. 2 is a schematic view of a system 200 for finding vulnerabilities in a software project. The system 200 can comprise a dependency file parser 204, a first condensed dataset generator 208, a vulnerability database 212, a second condensed dataset generator 216, an additional feature database 220, and an additional dependency CPE database 222.

The dependency file parser 204 may be configured to receive a dependency file 202, wherein the dependency file 202 may specify software components related to the software project. The dependency file parser 204 can extract information from the dependency file 202, wherein the extracted information may comprise one or more dependency attributes. The one or more dependency attributes may be chosen from a group consisting of dependency vendor, dependency product, dependency version, dependency update or dependency target software. The dependency file parser can be received from a plurality of dependency file parsers, wherein each dependency file parser is configured for a specific programming language. Thus, the system 200 may be configured to handle multiple dependency file programming languages by using a specific dependency file parser 204 for each specific programming language.

A first dependency common platform enumeration, CPE, 206 may be generated from the one or more dependency attributes. The first dependency CPE 206 may be generated by combining the one or more dependency attributes into a predetermined CPE format. The predetermined CPE format should be understood as being a format where the one of more dependency attributes may be added, maintaining a machine-readable format.

The vulnerability database 212 may be configured to transmit vulnerability CPEs 214, wherein the vulnerability CPEs 214 may comprise one or more vulnerability attributes. The one or more vulnerability attributes may be chosen from the group consisting of vulnerability vendor, vulnerability product, vulnerability version, vulnerability update or vulnerability target software. The vulnerability database may further comprise additional information related to the vulnerabilities, such as common vulnerability enumerations, CVEs, linked to the vulnerability CPEs. The CVEs can provide a summary describing the vulnerability.

The first dependency CPE 206 and the vulnerability CPEs 210 may be transmitted to the first condensed dataset generator 208 for generating a first condensed dataset 214 of vulnerability CPEs by selecting the vulnerability CPEs 210 that has at least one vulnerability attribute that matches at least one dependency attribute in the first dependency CPE. The first condensed dataset generator 208 may be configured to receive a number of dependency CPEs from the additional dependency CPE database 222. The number of dependency CPEs may have similar dependency attributes as the first dependency CPE. The first condensed dataset generator 208 may further be configured to select additional vulnerability CPEs. The additional vulnerability CPEs may have at least one vulnerability attribute that matches at least one dependency attribute in at least one of the number of the dependency CPEs. Upon that may be the case, the first condensed dataset generator 208 may be configured to add the additional vulnerability CPEs to the first condensed dataset 214 of vulnerability CPEs.

The first condensed dataset generator 208 may be configured to find as many matching vulnerability CPEs 214 as possible to the first dependency CPE 206. By matching vulnerability CPEs 214, it is herein meant a vulnerability CPE comprising one or more vulnerability attributes that matches at least one dependency attribute in the first dependency CPE. According to one non-limiting example, this may be done by ignoring the vulnerability vendor part of a CPE and let the first condensed dataset generator 208 do an exact product match. By the exact product match, it is herein meant selecting all vulnerability vendors which has the same vulnerability product as the first dependency CPE 206 has. Thus, the dependency product and the vulnerability product may be the same. However, it should be noted for the person skilled in the art that the first condensed dataset generator 208 may be configured to a partial product match. By doing the partial product match, it may provide for a greater recall compared to ignoring the vulnerability vendor part of the CPE. According to another non-limiting example, if the first condensed dataset generator 208 may be receiving a first dependency CPE 206 comprising a dependency vendor "symfony" and a dependency product "symfony", the first condensed dataset generator 208 may be configured to look through the vulnerability database 212. If the first condensed dataset generator 208 may find that there is a vulnerability product "symfony" in the vulnerability database 212 with the vulnerability vendor "sensiolabs" it may add that along with the first dependency CPE 206 as two separate vulnerability CPEs 210. The two separate vulnerability CPEs may be added with the first dependency CPE 206 in the first condensed dataset 214. As a result, for this single file CPE symfony.symfony, the first condensed dataset generator 208 may have the following vulnerability CPEs:

~:symfony:symfony:3.4.0:~:~:~:~:~
~:symfony:symfony:3.4.0:~:~:~:~:php
~:symfony:symfony:3.4.0:~:~:~:~:wordpress
~:symfony:symfony:3.4.0:~:~:~:~:magento
~:sensiolabs:symfony:3.4.0:~:~:~:~:~
~:sensiolabs:symfony:3.4.0:~:~:~:~:php
~:sensiolabs:symfony:3.4.0:~:~:~:~:wordpress
~:sensiolabs:symfony:3.4.0:~:~:~:~:magento Alternatively, or in combination, the first condensed dataset generator 208 may also add alternative dependency CPEs connected to these dependency and vulnerability vendor/product pairs. The dependency and vulnerability vendor/product pairs may have target software set based on a predefined list of one or more typical target software found for the given format, to further increase the recall. As a non-limiting example, the alternative dependency CPEs may be created to capture different naming conventions of the dependency attributes. The alternative dependency CPEs may be added from the additional dependency CPE database 222. The additional dependency CPE database 222 may comprise external dependency files, especially dependency CPEs of the external dependency files. By external dependency files it is herein meant dependency files corresponding to other software projects. The external dependency files may be within the system 200. The additional dependency CPE database 222 may further comprise one or more affected dependencies for each vulnerability. The one or more affected dependency may be received from external data sources, e.g. the National Vulnerability Database (NVD).

The first condensed dataset 214 may be transmitted to the second condensed dataset generator 216 for generating a second condensed dataset 218 of vulnerability CPEs from the first condensed dataset 214 of vulnerability CPEs.

A confidence score related to each vulnerability CPE from the first condensed dataset 214 can be determined, based on the vulnerability attributes of the vulnerability CPEs 210 together with the dependency attributes of the matched dependency CPE. The confidence score can also be determined in combination with additional feature data that can be provided by external data sources. The additional feature data from external data sources is further described in relation to FIG. 4. The confidence score can provide an estimation of the probability whether a vulnerability CPE is a true positive, i.e. relevant to the dependency CPE, or not. The confidence score can be determined by the use of a machine learning model which takes a number of features as input. The features can be determined based on the vulnerability attributes of the vulnerability CPE and the dependency attributes of the matching dependency CPE, alternatively in combination with the additional feature data.

As non-limiting examples, features may be constructed from the following question;
- Is the dependency vendor found in the vulnerability product?
- If the vulnerability vendor is no more than three times the length of the dependency product, is the dependency product found in the vulnerability vendor?
- Is the vulnerability target software found in the dependency target software?
- If both vulnerability target software and dependency target software are provided, is the vulnerability target software not found in the dependency target software?
- Is the dependency language found in vulnerability languages? If a match is made, a confidence may be returned that is equal to the matched language saturation in the repository, according to vulnerability languages.
- If both vulnerability language and dependency language are provided, is the dependency language not found in the vulnerability language?
- Are vulnerability vendor and dependency vendor, and vulnerability product and dependency product strictly equal?
- Is the dependency product found in the vulnerability product, or vulnerability product found in the dependency product?
- Is the dependency vendor found in the vulnerability vendor, or vulnerability vendor found in the dependency vendor?

As additional non-limiting examples, features may be constructed from;
- Character level Term Frequency-Inverse Document Frequency (TF-IDF) and Euclidean distance comparison between vulnerability vendor and dependency vendor. Returns a normalized distance.
- Character level TF-IDF and Euclidean distance comparison between vulnerability product and dependency product. Returns a normalized distance.
- Mean of character level TF-IDF and Euclidean distance comparison between vulnerability vendor and dependency vendor, & vulnerability product and dependency product. Returns a normalized distance.
- Character level TF-IDF and Euclidean distance comparison between dependency vendor and vulnerability product. Returns a normalized distance.
- Character level TF-IDF and Euclidean distance comparison between vulnerability vendor and vulnerability product. Returns a normalized distance.
- Mean of character level TF-IDF and Euclidean distance comparison between vulnerability product and dependency vendor, & vulnerability vendor and dependency product. Returns a normalized distance.
- One-hot encoding of dependency language.
- Vectorized representation of language saturation, provided by vulnerability language. For example, [0.0, 0.3, 0.7] (java, go, javascript)).

Ways of extracting the confidence score from the machine learning model may be, but is not limited to, the share of trees that predict positive in a random forest algorithm, the firing strength of sigmoid normalized neural network, the firing strength of a logistic regression, or the conditional probability output of a Bayesian model.

The second condensed dataset of vulnerability CPEs 218 can be generated by selecting those vulnerability CPEs that has a confidence score above a certain threshold. The threshold can have a pre-determined value, or have a user-defined value, or have a variable value.

The second condensed dataset generator 216 can be such that it maximizes precision, i.e. minimizing the number or false positives. This can be seen as discriminating the results of the first condensed dataset generator 208.

Figure 3:
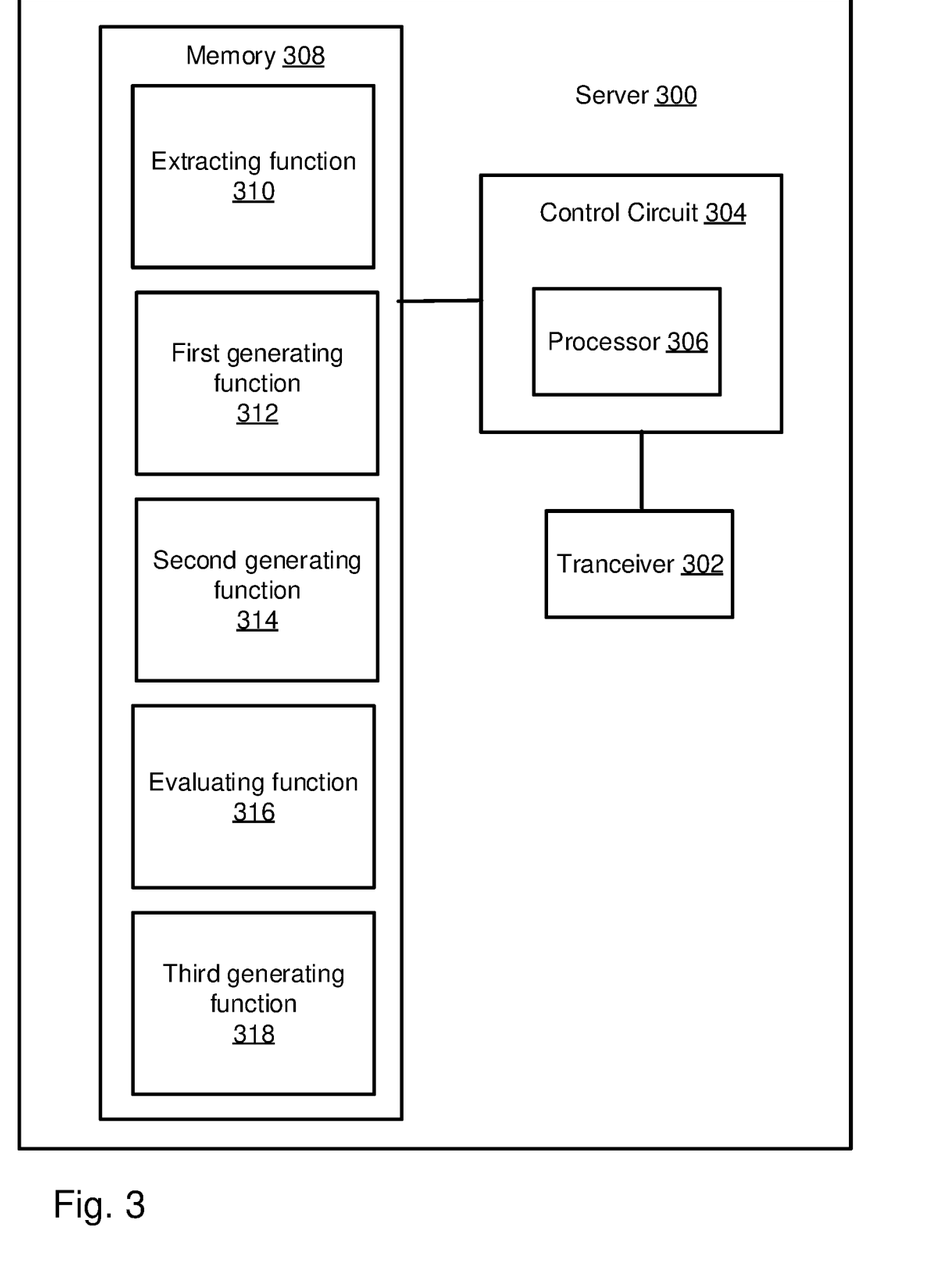
FIG. 3 illustrates a server configured to find vulnerabilities in a software project.

FIG. 3 illustrates a schematic view of a server 300. The server 300 is configured for finding vulnerabilities in a software project. The server 300 comprises a transceiver 302, a control unit 304 and a memory 308.

The transceiver 302 is configured to enable the server 300 to communicate with other devices, such as a vulnerability database, VD. The transceiver 302 may be configured to receive a dependency file, wherein the dependency file may specify software components related to the software project. The transceiver 302 may be configured to receive a dependency file parser from a plurality of dependency file parsers, wherein the dependency file parser is configured for a programming language of the dependency file. The transceiver 302 may be configured to receive vulnerability CPEs, wherein the vulnerability CPE comprises one or more vulnerability attributes, from the vulnerability database, VD.

The control circuit 304 may be configured to perform the control of functions and operations of the server 300. The control circuit 304 may include a processor 306, such as a central processing unit (CPU). The processor can be configured to execute program code stored in the memory 308, in order to perform functions and operations of the server 300.

The control circuit 304 may execute an extracting function 310. The extracting function 310 may be configured to extract information from the dependency file using the dependency file parser. The extracted information may comprise one or more dependency attributes.

The control circuit 304 may execute a first generating function 312. The first generating function 312 may be configured to generate a dependency common platform enumeration, CPE, based on the one or more dependency attributes.

The control circuit 304 may execute a second generating function 314. The second generating function 314 may be configured to generate a first condensed dataset of vulnerability CPEs by selecting the vulnerability CPEs that has at least one vulnerability attribute that matches at least one dependency attribute in the dependency CPE.

The control circuit 304 may execute an evaluating function 316. The evaluating function 316 may be configured to evaluate the vulnerability CPEs of the first condensed dataset of vulnerability CPEs by determining a confidence score, wherein the confidence score defines a probability of the vulnerability CPE being relevant to the software project.

The control circuit 304 may execute a third generating function 318. The third generating function 318 may be configured to generate a second condensed dataset of vulnerability CPEs, wherein the second condensed dataset is smaller than the first condensed dataset, from the first condensed dataset of vulnerability CPEs by selecting the vulnerability CPEs that has a confidence score above a threshold.

Figure 4:
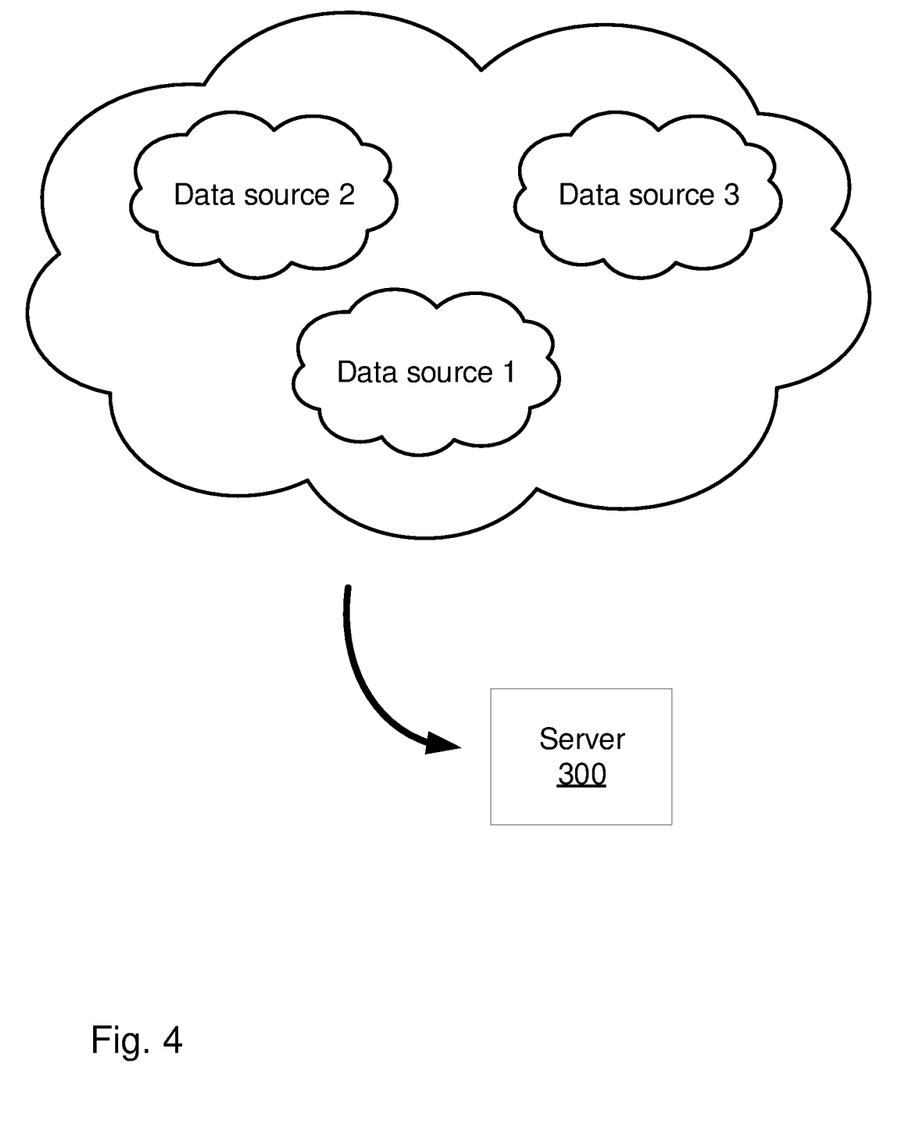
FIG. 4 illustrates a schematic view of data sources and the server illustrated in FIG. 3.

FIG. 4 schematically illustrates how additional feature data can be provided to the system through external data sources, e.g. to the server 300 via the additional feature database 220 discussed above. Any number of external data sources can be provided, even though illustrated as three data sources.

As an example, a data source can be online repositories, such as GitHub.

As another example, a data source can be online forums, such as forums discussing software and software issues.

As yet another example, a data source can be a package manager.

As a non-limiting example, the additional feature data can be information about what programming language a vulnerability CPE uses. This information is already known about the dependency CPE, based on what dependency file parser was used. Knowing what language both the vulnerability CPE and the dependency CPE uses, can provide information about the probability of the vulnerability CPE being relevant to the dependency CPE.

Figure 5:
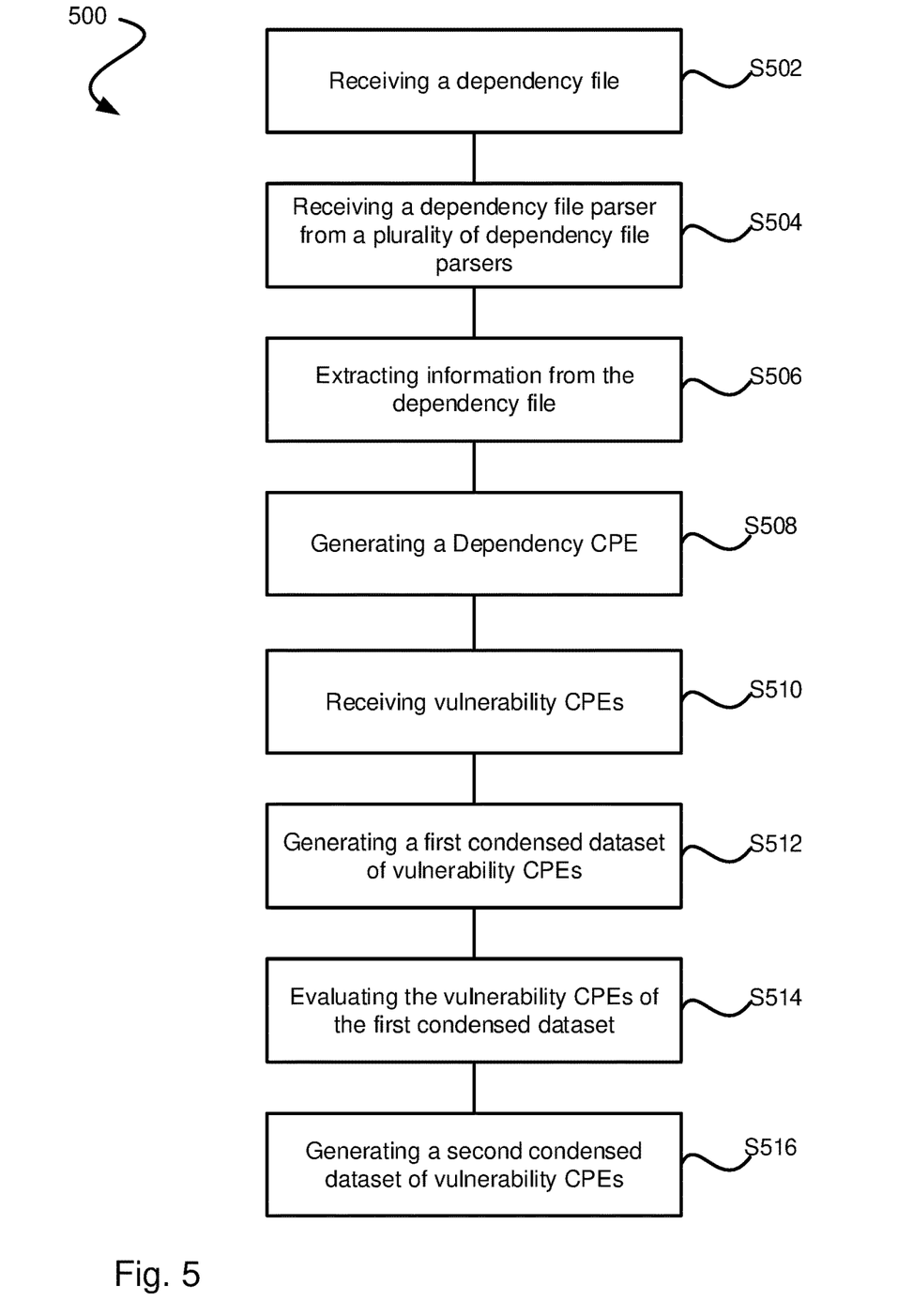
FIG. 5 is a flowchart illustrating the steps of a method for finding vulnerabilities in a software project.

FIG. 5 is a flowchart illustrating the steps of a method 500 for finding vulnerabilities in a software project.

In a first step S502, a dependency file is received, wherein the dependency file may be specifying software components related to the software project.

In a second step S504, a dependency file parser may be received from a plurality of dependency file parsers. The dependency file parser may be configured for a programming language of the dependency file. Each dependency file parser from the plurality of dependency file parsers may be configured for a specific programming language.

In a third step S506, information may be extracted from the dependency file using the dependency file parser. The extracted information may comprise one or more dependency attributes. The one or more dependency attributes may be chosen from the group consisting of dependency vendor, dependency product, dependency version, dependency update or dependency target software.

In a fourth step S508, a first dependency common platform enumeration, CPE, may be generated, wherein the first dependency CPE may be based on the one or more dependency attributes.

In a fifth step S510, vulnerability CPEs may be received from a vulnerability database, VD. The vulnerability CPE may comprise one or more vulnerability attributes. The one or more vulnerability attributes may be chosen from the group consisting of vulnerability vendor, vulnerability product, vulnerability version, vulnerability update or vulnerability target software.

In a sixth step S512, a first condensed dataset of vulnerability CPEs may be generated by selecting the vulnerability CPEs that has at least one vulnerability attribute that matches at least one dependency attribute in the first dependency CPE. The match of at least one attribute between a vulnerability CPE and the dependency CPE may be a partial fit.

Optionally, the sixth step S512 may comprise receiving a number of dependency CPEs from an additional dependency CPE database 222. The number of dependency CPEs may have similar dependency attributes to the first dependency CPE. Optionally, the sixth step S512 may comprise selecting additional vulnerability CPEs that has at least one vulnerability attribute that matches at least one dependency attribute in any of the dependency CPEs with similar dependency attributes to the first dependency CPE. Optionally, the sixth step S512 may comprise adding the additional vulnerability CPEs to the first condensed dataset of vulnerability CPEs.

In a seventh step S514, the vulnerability CPEs from the first condensed dataset of vulnerability CPEs may be evaluated by determining a confidence score for each vulnerability CPE. The confidence score may be an estimate of a probability of the vulnerability CPE being relevant to the software project. Put differently, the confidence score may be an estimate of the probability that the vulnerability described by the vulnerability CPE exists in a software component of the software project.

Optionally, the seventh step S514 may comprise receiving additional feature data from an additional feature database 220. The additional feature data may comprise information about the vulnerability CPEs. Optionally, the seventh step S514 may comprises generating, for each vulnerability CPE of the first condensed dataset of vulnerability CPEs in combination with the dependency CPE and the additional feature data, a number of features. Optionally, the seventh step S514 may comprises determining the confidence score for each vulnerability CPE by using the features as input to a machine learning, ML, model. The ML model may be configured to determine the confidence score by combining the features. Optionally, the additional feature data about the vulnerability CPEs may be provided by one or more external and/or independent data sources. In either case, the additional feature data may be provided by other data sources other than the vulnerability database According to one non-limiting example, the one or more independent data sources may be online repositories and/or package managers and/or online forums.

Optionally, the method may further comprise training the ML model, wherein training the ML model may comprise the steps of forming a training dataset, wherein the training dataset comprises historically known pairs of dependency CPEs and vulnerability CPEs labeled with either being relevant or not relevant; dividing the training dataset into a training set and a validation set; fitting parameters of the ML model by applying the model to training set; and optimizing the ML model using historically known pairs in the validation set.

In an eighth step S516, a second condensed dataset of vulnerability CPEs may be generated, wherein the second condensed dataset is smaller than the first condensed dataset. The second condensed dataset of vulnerability CPEs may be generated from the first condensed dataset of vulnerability CPEs by selecting the vulnerability CPEs that has a confidence score above a threshold. The threshold may be a user-defined value.

Figure 6:
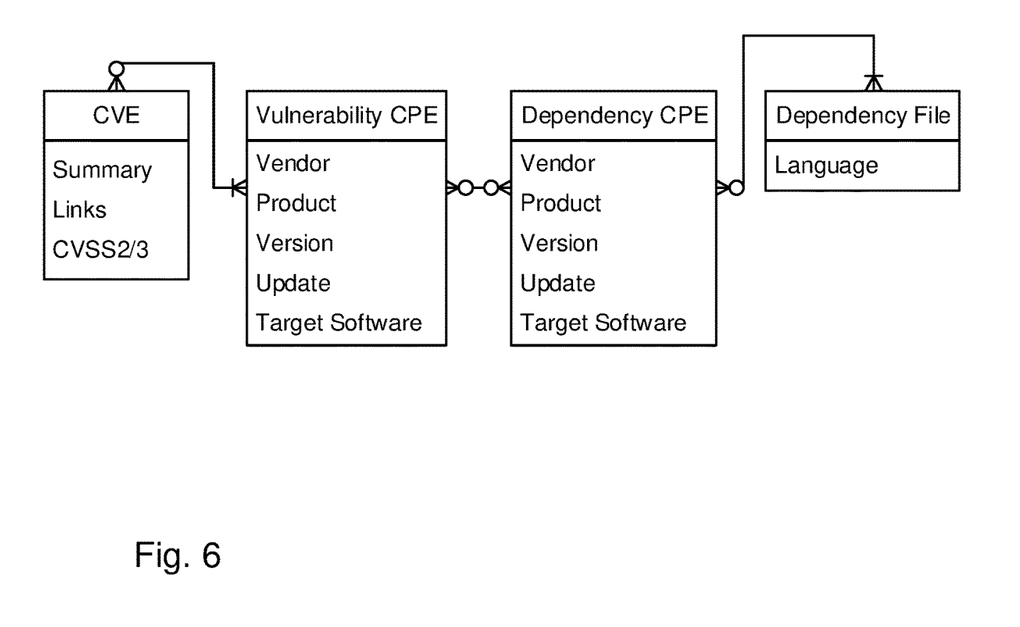
FIG. 6 illustrates the data relations between dependency file, dependency CPE, vulnerability CPE and CVE.

FIG. 6 illustrates the data relations between dependency file, dependency CPE, vulnerability CPE and CVE. The dependency file can specify what software components are related to a software project. The structure of the dependency file can be different depending on the software-language and package-manager. From a dependency file a dependency CPE can be generated. The dependency CPE can have a predetermined CPE format that can formalize the data of the dependency file. The dependency CPE can specify vendor, product, version, update, target software and row number for a software component mentioned in the dependency file.

A CVE can comprise information of a vulnerability within a software. The CVE can be linked to zero or more vulnerability CPEs. The vulnerability CPEs can specify vendor, product, version, update and target software of the software components mentioned in the CVE. The vulnerability CPEs can then be compared with a dependency CPE.

From the description above follows that, although various embodiments of the disclosure have been described and shown, the disclosure is not restricted thereto, but may also

The invention claimed is:

1. A method for finding vulnerabilities in a software project, the method comprising:
   receiving a dependency file, specifying software components related to the software project;
   extracting information from the dependency file using a dependency file parser, wherein the dependency file parser is configured for a programming language of the dependency file, and wherein the extracted information comprises one or more dependency attributes;
   generating a first dependency common platform enumeration, CPE, based on the one or more dependency attributes, the one or more dependency attributes comprising one or more of: dependency vendor, dependency product, dependency version, dependency update and dependency target software;
   receiving vulnerability CPEs from a vulnerability database, VD, wherein the vulnerability CPEs comprises one or more vulnerability attributes, the one or more vulnerability attributes comprising one or more of: a vulnerability vendor, vulnerability product, vulnerability version, vulnerability update and vulnerability target software;
   generating a first condensed dataset of vulnerability CPEs by selecting the vulnerability CPEs having at least one vulnerability attribute that matches at least one dependency attribute in the first dependency CPE;
   evaluating the vulnerability CPEs from the first condensed dataset of vulnerability CPEs by determining a confidence score for each vulnerability CPE having at least one vulnerability attribute that matches at least one dependency attribute in the first dependency CPE, wherein the confidence score is an estimate of a probability of the vulnerability CPE being relevant to the software project; and
   generating a second condensed dataset of vulnerability CPEs, wherein the second condensed dataset is smaller than the first condensed dataset, from the first condensed dataset of vulnerability CPEs by selecting each of the vulnerability CPEs having a respective confidence score above a threshold, the second condensed dataset excluding vulnerability CPEs having a confidence score below the threshold.

2. The method according to claim 1, wherein the one or more dependency attributes are chosen from the group consisting of dependency vendor, dependency product, dependency version, dependency update or dependency target software.

3. The method according to claim 1, wherein the step of evaluating the vulnerability CPEs from the first condensed dataset of vulnerability CPEs comprises the steps,
   receiving additional feature data from an additional feature database, wherein the additional feature data comprises information about the vulnerability CPEs;
   generating, for each vulnerability CPE of the first condensed dataset of vulnerability CPEs in combination with the dependency CPE (206) and the additional feature data, a number of features; and
   determining the confidence score for each vulnerability CPE by using the features as an input to a machine learning, ML, model, wherein the ML model is configured to determine the confidence score by combining the features.

4. The method according to claim 1, wherein each dependency file parser from the plurality of dependency file parsers is configured for a specific programming language.

5. The method according to any one of the preceding claims, wherein the step of evaluating the vulnerability CPEs from the first condensed dataset of vulnerability CPEs comprises the steps,
   receiving additional feature data from an additional feature database, wherein the additional feature data comprises information about the vulnerability CPEs;
   generating, for each vulnerability CPE of the first condensed dataset of vulnerability CPEs in combination with the dependency CPE (206) and the additional feature data, a number of features; and
   determining the confidence score for each vulnerability CPE by using the features as an input to a machine learning, ML, model, wherein the ML model is configured to determine the confidence score by combining the features.

6. The method according to claim 5, further comprising training the ML model, wherein training the ML model comprises:
   forming a training dataset, wherein the training dataset comprises historically known pairs of dependency CPEs and vulnerability CPEs labeled with either being a correct match or not;
   dividing the training dataset into a training set and a validation set;
   fitting parameters of the ML model by applying the model to training set; and
   optimizing the ML model using historically known pairs in the validation set.

7. The method according to claim 5, wherein the additional feature data about the vulnerability CPEs are provided by one or more different data sources.

8. The method according to claim 7, wherein the one or more different data sources are online repositories, package managers, and/or online forums.

9. The method according to claim 1, wherein the threshold is a user-defined value.

10. The method according to claim 1, wherein the matching of at least one attribute between a vulnerability CPE and the dependency CPE is a partial fit.

11. The method according to claim 1, wherein the step of generating a first condensed dataset of vulnerability CPEs further comprising the steps,
    receiving a number of dependency CPEs from an additional dependency CPE database, wherein the number of dependency CPEs have similar dependency attributes to the first dependency CPE;
    selecting additional vulnerability CPEs that has at least one vulnerability attribute that matches at least one dependency attribute in any of the dependency CPEs with similar dependency attributes to the first dependency CPE; and
    adding the additional vulnerability CPEs to the first condensed dataset of vulnerability CPEs.

12. A server configured for finding vulnerabilities in a software project, the server comprising a transceiver, a control circuit comprising a processor and a memory,
    wherein the transceiver is configured to:
        receive a dependency file, specifying software components related to the software project;
        receive vulnerability CPEs, from a vulnerability database, VD, wherein the vulnerability CPEs comprises one or more vulnerability attributes, the one or more vulnerability attributes comprising one or more of: a vulnerability vendor, vulnerability product, vulnerability version, vulnerability update and vulnerability target software;
wherein the control circuit is configured to execute:
an extracting function configured to extract information from the dependency file using a dependency file parser, wherein the dependency file parser is configured for a programming language of the dependency file, and wherein the extracted information comprises one or more dependency attributes, the one or more dependency attributes comprising one or more of: dependency vendor, dependency product, dependency version, dependency update and dependency target software;
a first generating function configured to generate a first dependency common platform enumeration, CPE, based on the one or more dependency attributes;
a second generating function configured to generate a first condensed dataset of vulnerability CPEs by selecting the vulnerability CPEs having at least one vulnerability attribute that matches at least one dependency attribute in the first dependency CPE;
an evaluating function configured to evaluate the vulnerability CPEs of the first condensed dataset of vulnerability CPEs by determining a confidence score for each vulnerability CPE having at least one vulnerability attribute that matches at least one dependency attribute in the first dependency CPE, wherein the confidence score defines a probability of the vulnerability CPEs being relevant to the software project; and
a third generating function configured to generate a second condensed dataset of vulnerability CPEs, wherein the second condensed dataset is smaller than the first condensed dataset, from the first condensed dataset of vulnerability CPEs by selecting each of the vulnerability CPEs having a respective confidence score above a threshold, the second condensed dataset excluding vulnerability CPEs having a confidence score below the threshold.

13. The server according to claim 12, wherein the one or more dependency attributes are chosen from the group consisting of dependency vendor, dependency product, dependency version, dependency update or dependency target software.

14. The server according to claim 12, wherein the one or more vulnerability attributes are chosen from the group consisting of vulnerability vendor, vulnerability product, vulnerability version, vulnerability update or vulnerability target software.

15. A system for finding vulnerabilities in a software project, the system comprising a transceiver, a control circuit comprising a processor, and a memory, the memory comprising computer readable instructions that cause the control circuit to execute:
a dependency file parser configured to generate a first dependency common platform enumeration, CPE, based on a dependency file specifying components related to the software project, wherein the first dependency CPE comprises one or more dependency attributes;
a first condensed dataset generator configured to access a vulnerability database comprising vulnerability CPEs, wherein each of the vulnerability CPEs comprises one or more vulnerability attributes, and generate a first condensed dataset of vulnerability CPEs by selecting the vulnerability CPEs that has at least one vulnerability attribute that matches at least one dependency attribute in the first dependency CPE;
an evaluating function comprising a machine learning (ML) model configured to determine a confidence score for each vulnerability CPE; and
a second condensed dataset generator configured to generate a second condensed dataset of vulnerability CPEs, wherein the second condensed dataset is smaller than the first condensed dataset, from the first condensed dataset of vulnerability CPEs by selecting the vulnerability CPEs having a respective confidence score above a threshold; wherein the evaluating function trains the ML model by receiving a training dataset, wherein the training dataset comprises historically known pairs of dependency CPEs and vulnerability CPEs labeled with either being a correct match or not; dividing the training dataset into a training set and a validation set; fitting parameters of the ML model by applying the model to training set; and optimizing the ML model using historically known pairs in the validation set.

16. The system of claim 15, further comprising an additional features database configured to add additional feature data to the system, wherein the evaluating function evaluates the vulnerability CPEs from the first condensed dataset of vulnerability CPEs by receiving additional feature data from the additional feature database, wherein the additional feature data comprises information about the vulnerability CPEs;
generating, for each vulnerability CPE of the first condensed dataset of vulnerability CPEs in combination with the dependency CPE (206) and the additional feature data, a number of features; and
determining the confidence score for each vulnerability CPE by using the features as an input to the ML model, wherein the ML model is configured to determine the confidence score by combining the features.

17. The system of claim 15, wherein the one or more dependency attributes are chosen from the group consisting of dependency vendor, dependency product, dependency version, dependency update or dependency target software.

18. The system of claim 17, wherein the one or more vulnerability attributes are chosen from the group consisting of vulnerability vendor, vulnerability product, vulnerability version, vulnerability update or vulnerability target software.

19. The system of claim 15, wherein the matching of at least one attribute between a vulnerability CPE and the dependency CPE is a partial fit.

20. The system according to claim 15, wherein the first condensed dataset generator generates the first condensed dataset of vulnerability CPEs by receiving a number of dependency CPEs from an additional dependency CPE database, wherein the number of dependency CPEs have similar dependency attributes to the first dependency CPE; selecting additional vulnerability CPEs that has at least one vulnerability attribute that matches at least one dependency attribute in any of the dependency CPEs with similar dependency attributes to the first dependency CPE; and adding the additional vulnerability CPEs to the first condensed dataset of vulnerability CPEs.

* * * * *